United States Patent
Jung

(10) Patent No.: US 7,047,025 B2
(45) Date of Patent: May 16, 2006

(54) APPARATUS AND METHOD FOR PROCESSING PAGING FOR WCDMA TERMINAL

(75) Inventor: Chang-Ho Jung, Kyunggi-Do (KR)

(73) Assignee: LG Electronics Inc., Seoul (KR)

( * ) Notice: Subject to any disclaimer, the term of this patent is extended or adjusted under 35 U.S.C. 154(b) by 305 days.

(21) Appl. No.: 10/355,157

(22) Filed: Jan. 31, 2003

(65) Prior Publication Data

US 2003/0203739 A1   Oct. 30, 2003

(30) Foreign Application Priority Data

Apr. 25, 2002   (KR) .................. 10-2002-0022789

(51) Int. Cl.
*H04Q 7/20*   (2006.01)

(52) U.S. Cl. .................. 455/458; 455/450; 455/522

(58) Field of Classification Search .............. 455/458, 455/450, 403, 522, 67.11; 375/130, 135–137, 375/140, 146–147, 316, 296; 370/320, 332–334, 370/335, 342
See application file for complete search history.

(56) References Cited

U.S. PATENT DOCUMENTS

| | | | |
|---|---|---|---|
| 5,751,705 A * | 5/1998 | Sato ........................... 370/335 |
| 6,275,680 B1 | 8/2001 | Martin et al. | |
| 6,430,414 B1 * | 8/2002 | Sorokine et al. .............. 455/442 |
| 6,498,785 B1 * | 12/2002 | Derryberry et al. .......... 370/311 |
| 6,542,756 B1 * | 4/2003 | Kim ........................... 455/522 |
| 6,697,622 B1 * | 2/2004 | Ishikawa et al. ............. 455/434 |
| 6,822,948 B1 * | 11/2004 | Bergstrom et al. ........... 370/332 |
| 6,829,486 B1 * | 12/2004 | McKenna et al. ........... 455/464 |
| 6,891,815 B1 * | 5/2005 | Song ........................... 370/335 |
| 6,904,291 B1 * | 6/2005 | Miyamoto et al. .......... 455/522 |
| 2001/0008838 A1 * | 7/2001 | Toskala et al. .............. 455/458 |
| 2001/0043642 A1 * | 11/2001 | Hirata ......................... 375/144 |
| 2002/0154610 A1 * | 10/2002 | Tiedemann et al. ......... 370/329 |
| 2003/0072281 A1 * | 4/2003 | Hirata ......................... 370/335 |

FOREIGN PATENT DOCUMENTS

| | | |
|---|---|---|
| EP | 0 655 872 A2 | 5/1995 |
| EP | 1 081 976 A2 | 3/2001 |
| JP | 11-074950 | 3/1999 |
| KR | 2002-0002073 A | 1/2002 |
| KR | 2002-0014108 A | 2/2002 |
| WO | WO 99/16190 | 4/1999 |

* cited by examiner

*Primary Examiner*—CongVan Tran
(74) *Attorney, Agent, or Firm*—Birch, Stewart, Kolasch & Birch, LLP

(57) ABSTRACT

An apparatus and method for processing a paging in a WCDMA terminal realize a hardware device for checking whether or not there is a page by interpreting a PICH and an SCCPCH according to a DXR cycle. When a page is detected by this device, a digital base band unit (DBB) is turned on to analyze a PI (paging indicator) of the PICH and a MAC header of the SCCPCH. Therefore, there is no need to operate the DBB at every DXR cycle to check for a page, and thereby the processing loads of the DBB and power consumption of the WCDMA terminal can be reduced significantly.

21 Claims, 3 Drawing Sheets

APPARATUS AND METHOD FOR PROCESSING PAGING FOR WCDMA TERMINAL

The present application claims the priority benefit of Korean Patent Application No. 22789/2002 filed on Apr. 25, 2002, the entire contents of which are incorporated by reference.

BACKGROUND OF THE INVENTION

1. Field of the Invention

The present invention relates to a wideband code division multiple access (WCDMA) terminal system, and particularly, to an apparatus and a method for processing a paging in the WCDMA terminal.

2. Description of the Background Art

In a WCDMA mobile communication system, a base station uses a paging indicator channel (PICH) in order to provide a WCDMA terminal with information about the system or to notify the WCDMA terminal of a call.

The PICH is a fixed rate physical channel, and a paging indicator (PI) is transmitted from the base station through the PICH. Generally, a plurality of different WCDMA terminals are grouped together to form a 'receiving group'. Each WCDMA terminal belongs to a particular receiving group. The PI identifies a particular receiving group to which a particular WCDMA terminal (for which a paging is intended), belongs. That is, the PI carries information specifying the intended receiving group associated with the current paging.

FIG. 1 shows a configuration of the PICH and a secondary common control physical channel (SCCPCH) used in a general WCDMA system.

Referring to FIG. 1, The PICH is repeatedly transmitted at every frame during a certain section. Here, one frame is 10 ms. The PICH is always related to the SCCPCH including a paging channel (PCH). There is a time difference of as much as $T_{PICH}$ between the PICH frame and the SCCPCH frame related to the PICH frame. That is, when a PI is set in the PICH, the PCH including a paging message is transmitted through the SCCPCH. The SCCPCH is transmitted after the $T_{PICH}$ time has elapsed since the PICH had been transmitted. Herein, the $T_{PICH}$ time means 7680 chips and corresponds to 3 slots (2 ms).

FIG. 2 shows a configuration of a general WCDMA terminal for processing a paging.

As shown therein, the WCDMA terminal generally comprises: a radio frequency (RF) unit 1 for down-converting a frequency of an RF signal received through an antenna; an analog base band unit (ABB) 2 for demodulating a signal outputted from the RF unit 1 and thereby outputting a data frame; and a digital base band unit (DBB) 3 for modulating the data frame from the ABB 2 to identify whether or not there is a paging and for accessing the paging message if there is a paging.

Operations for processing a paging of the general WCDMA terminal will be described as follows.

When a paging for a certain WCDMA terminal is generated, the WCDMA system sets a PI of a PICH to identify a receiving group having a particular WCDMA terminal for which the paging is intended. That is, the PI as set indicates the presence of a paging for the identified receiving group. After that, the WCDMA system transmits repeatedly the PICH including the set PI at every frame in predetermined sections.

The WCDMA terminal is operated according to a discontinuous received (DXR) cycle in order to interpret the PICH. The DXR cycle is a period for demodulating the PCH. That is, during a preparing time $d_{RF}$ shown in FIG. 1, the RF unit 1 and the ABB 2 of the WCDMA terminal demodulate an RF signal to output the data frame(s). Then the DBB 3 analyzes the PI of the PICH in the data frame. If the PI identifies the receiving group to which the present WCDMA terminal belongs (i.e., the current paging is for the current WCDMA terminal's receiving group), then the DBB 3 examines the PCH of the SCCPCH after a predetermined time ($T_{PICH}$ time) elapses, and analyzes the PCH of the SCCPCH. Thereafter, the DBB 3 checks if the current paging is specifically for the current WCDMA terminal and if so, extracts a page message from the analyzed PCH.

TABLE 1

| Time order | RF unit | ABB | DBB |
|---|---|---|---|
| $t_1$~$t_2$ | ON | ON | (OFF) |
| $t_2$~$t_3$ | ON | ON | ON |
| $t_3$~$t_4$ | OFF | OFF | (OFF) |
| $t_4$~$t_5$ | ON | ON | ON |

Table 1 is a table for analyzing electric power supplied to the RF unit 1, the ABB 2 and the DBB 3 when the general WCDMA terminal operates the paging process.

As described above, the general WCDMA terminal obtains the PICH frame by operating the RF unit 1 and the ABB 2 during the preparing time $d_{RF}$ ($t_1$~$t_2$), and interprets the PICH frame during the time $t_2$~$t_3$ by operating the DBB 3 when it receives the PICH frame. If the PI of the interpreted PICH corresponds to the receiving group to which the current WCDMA terminal belongs, then the DBB 3 of the WCDMA terminal examines and interprets the PCH of the SCCPCH during 10 ms after a predetermined time ($T_{PICH}$) has elapsed.

However, the general WCDMA terminal checks whether or not the WCDMA terminal is paged using only the software of the DBB 3. Thus, the DBB 3 must be operated (turned on) at all times in order to check the paging according to the DXR cycle, even in case that the WCDMA terminal is not paged. This procedure places heavy processing loads on the DBB 3. Further, it become more difficult and time consuming to modify certain reference values used to compare with the PI in the general WCDMA terminal because all the paging processes are performed by running the software of the DBB 3 and the software must be modified.

Also, in the general WCDMA terminal, since all the paging processes are performed using the DBB 3, the electric power is supplied to the RF unit 1, the ABB 2 and the DBB 3 during a minimum (10 ms+$d_{RF}$) period (in case that the PI does not designate the particular receiving group to which the current WCDMA terminal belongs)~a maximum (22 ms+$d_{RF}$) period (in case that the PI designates the current terminal's receiving group). As a result, the power consumption by the general WCDMA terminal is high.

SUMMARY OF THE INVENTION

Therefore, an object of the present invention is to provide an apparatus and method for processing a paging for a wideband code division multiple access (WCDMA) terminal, which reduce the processing loads of a digital base band unit (DBB) by providing, external to the DBB, a device (hardware) for identifying whether or not a certain WCDMA terminal is paged.

Another object of the present invention is to provide an apparatus and method for processing a paging for a WCDMA terminal, which are able to reduce power consumption by pre-setting a reference paging indicator (PI) and a reference paging channel (PCH) for deciding whether or not a certain WCDMA terminal is paged, and by supplying electric power to a DBB unit so as to perform processes for receiving a paging message only in case that a PI of the PICH received from a base station coincides with the reference PI, and a PCH of the secondary common control physical channel (SCCPCH) coincides with the reference PCH.

Another object of the present invention is to provide an apparatus and method for processing a paging for a WCDMA terminal, which overcome the limitations and problems of the general paging processing apparatuses and methods.

To achieve the objects of the present invention, as embodied and broadly described herein, there is provided an apparatus for processing a paging for a WCDMA terminal, the apparatus comprising a page detecting unit which checks for a page according to a discontinuous received (DXR) cycle; and a digital base band unit (DBB) which performs a paging message retrieval process by being selectively turned on under control of the page detecting unit.

A method for processing a paging for a WCDMA terminal according to an embodiment of the present invention, includes checking for, by a page detecting unit, a page according to a discontinuous received (DXR) cycle; and selectively turning on a digital base band unit (DBB) under control of the page detecting unit; and performing, by the DBB, a paging message retrieval process once the DBB is turned on.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings. In describing the present invention, in case that it is decided that detailed descriptions for well-known function or configuration may vague the gist of the present invention, such detailed descriptions will be omitted.

Figure 1:
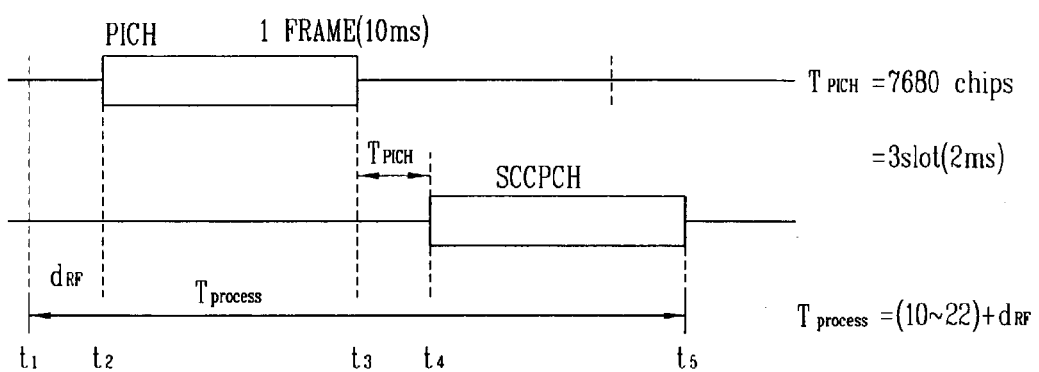
FIG. 1 is a diagram showing the configurations of a PICH and an SCCPCH used in a general WCDMA system.
Figure 2:
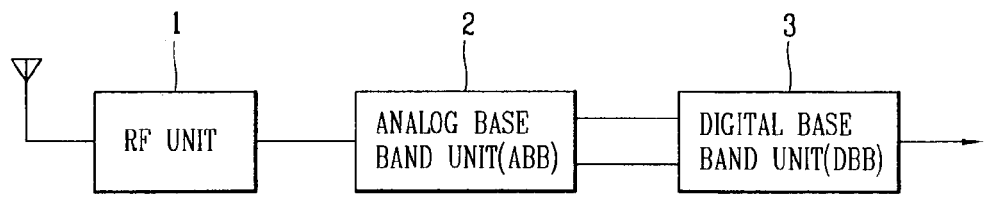
FIG. 2 is a block diagram of a general WCDMA terminal for processing a paging.
Figure 3:
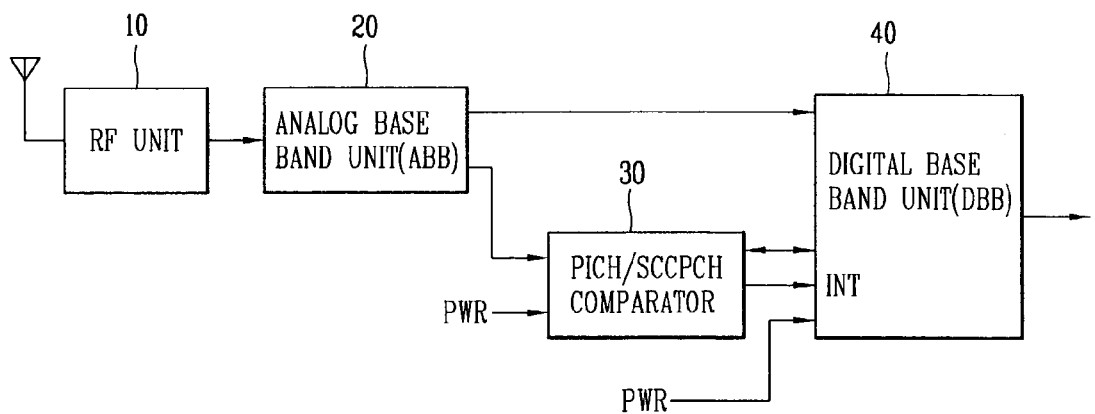
FIG. 3 is a block diagram of a WCDMA terminal for processing a paging according to an embodiment of the present invention.

FIG. 3 shows a configuration of a wideband code division multiple access (WCDMA) terminal for processing a paging according to an embodiment of the present invention.

As shown therein, the WCDMA terminal comprises: a radio frequency (RF) unit 10; an analog base band unit (ABB) 20; a PICH/SCCPCH comparator 30 for identifying whether or not there is a paging based on at least one data frame outputted from the ABB 20, and outputting an interrupt signal when there is a paging for the current WCDMA terminal; and a digital base band unit (DBB) 40 operating according to the interrupt signal and receiving a paging message based on the data frame. All these components of the WCDMA terminal are operatively coupled.

Figure 4:
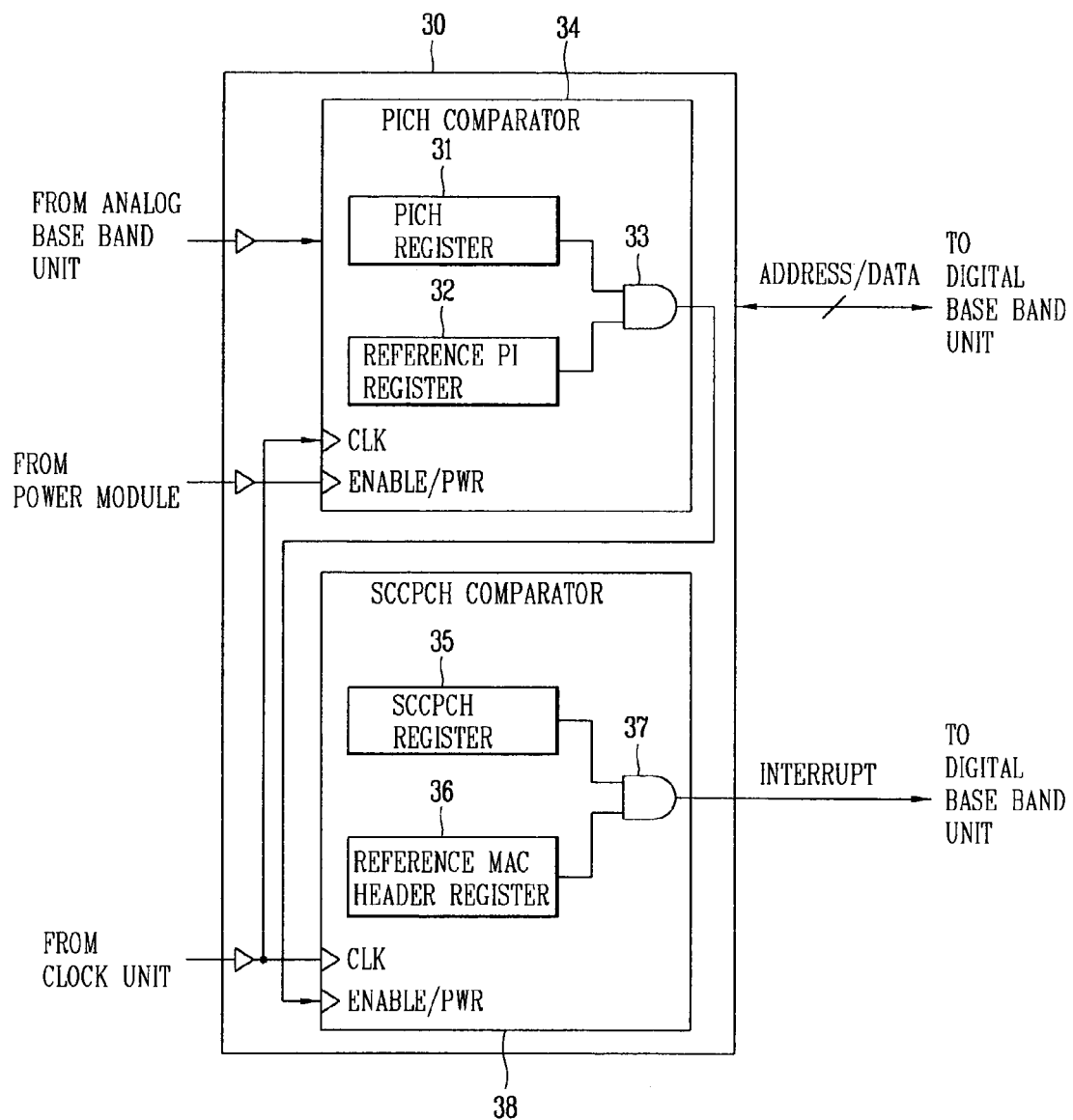
FIG. 4 is a block diagram of a PICH/SCCPCH comparator in the WCDMA terminal of FIG. 3 according to an embodiment of the present invention.

FIG. 4 shows a configuration of the PICH/SCCPCH comparator 30 in FIG. 3 according to an embodiment of the present invention. Here, the PICH/SCCPCH comparator 30 is implemented using hardware (and not software).

As shown in FIG. 4, the PICH/SCCPCH comparator 30 comprises: a PICH comparator 34 for checking whether or not a PI of a received PICH frame corresponds to or identifies a receiving group to which the WCDMA terminal of FIG. 3 belongs; and a SCCPCH comparator 38 for interpreting a MAC header of the SCCPCH according to an enable signal outputted from the PICH comparator 34, and outputting an interrupt to the DBB 40 in case that the MAC header identifies the current WCDMA terminal (i.e., the current WCDMA terminal is paged). All these components of the PICH/SCCPCH comparator 30 are operatively coupled.

The PICH comparator 34 comprises: a reference PI register 32 for storing a reference PI preset by the DBB 40 where the reference PI has a value that identifies the receiving group to which the current WCDMA terminal belongs; a PICH register 31 for detecting a PI of a PICH frame outputted from the ABB 20 when the electric power is supplied from a power module; and a first AND gate 33 for outputting an enable signal to the SCCPCH comparator 38 when the output value of the PICH register 31 and the output value of the reference PI register 32 coincide with each other. That is, the first AND gate 33 generates an enable signal when the PI of the received PICH frame is the same as the reference PI, which indicates that there is a paging intended for at least one terminal of the identified receiving group.

The SCCPCH comparator 38 comprises: a reference MAC header register 36 for storing a reference media access control (MAC) header preset by the DBB 40 where the reference MAC header has a value that identifies which one of the terminals of the receiving group has a paging; a SCCPCH register 35 for detecting a MAC header of the SCCPCH frame outputted from the ABB 20 according to the enable signal; and a second AND gate 37 for outputting an interrupt signal to the DBB 40 when the value of the SCCPCH register 35 and the value of the reference MAC header register 36 coincide with each other. That is, the interrupt signal is generated if the received MAC header is identical to the reference MAC header, which indicates that the paging is intended for the current WCDMA terminal.

Operations of the WCDMA terminal configured as above for processing the paging according to an embodiment of the present invention will be described as follows.

Table 2 shows the operations of the RF unit 10, the ABB 20, the PICH/SCCPCH comparator 30 and the DBB 40 in a time order.

TABLE 2

| Time order | RF unit | ABB | PICH/SCCPCH comparator | DBB | Description |
|---|---|---|---|---|---|
|  | OFF | OFF | ON | ON | Setting reference PI and reference MAC header |
| $t_1\sim t_2$ | ON | ON | OFF | OFF | Pre-heating |
| $t_2\sim t_3$ | ON | ON | ON | OFF | Comparing PICH (PI) |
| $t_3\sim t_4$ | OFF | OFF | OFF | OFF | Preparing SCCPCH if needed |
| $t_4\sim t_5$ | ON | ON | ON | OFF | Comparing PCH of SCCPCH (MAC header) |
|  | OFF | OFF | ON | ON | Generating interrupt to DBB by comparator; processing of paging message by DBB thereafter |

In advance, the DBB 40 of the WCDMA terminal sets the values of the reference PI and the reference MAC header in the reference PI register 32 and the reference MAC header register 36, respectively. As discussed above, the reference PI value will identify the receiving group of the current terminal, and the reference MAC header will identify the current terminal among other terminals of the identified receiving group. In one embodiment, the setting of these reference values is made only one time at the initial stage, and not whenever the data frame is received or at every DXR cycle. But, the setting or resetting of the reference values can be made as needed merely by modifying the registers 32 and 36.

After that, in order to receive the RF signal from an antenna, a power module (not shown) of the WCDMA terminal supplies selectively the RF unit 10 and the ABB 20 with the electric power to pre-heat them, during a preparing time period ($t_1\sim t_2$) for interpreting the PICH.

During a PICH frame period ($t_2\sim t_3$), the WCDMA terminal supplies the PICH comparator 34 of the PICH/SCCPCH comparator 30 with the electric power, and accordingly, the PICH comparator 34 is operated to analyze the PI of the PICH frame outputted from the ABB 20 during the period $t_2\sim t_3$.

When the PICH comparator 34 compares the PI of the received PICH frame with the stored reference PI and determines that the PI of the received PICH frame and the reference PI do not coincide with each other, the first AND gate 33 of the PICH comparator 34 does not generate an enable signal. Therefore, the SCCPCH comparator 38 is not operated, and consequently the DBB 40 is also not operated. That is, no power is supplied to the SCCPCH comparator 38 and the DBB 40 if there is no need to operate them (due to the absence of paging), whereby power can be saved significantly.

However, if the PICH comparator 34 determines that the PI of the received PICH frame and the reference PI do coincide with each other, the first AND gate 33 of the PICH comparator 34 generates an enable signal to the SCCPCH comparator 38.

After a time period of $T_{PICH}$ ($t_3\sim t_4$) elapses, the SCCPCH comparator 38 starts to operate. That is, during a time period ($t_4\sim t_5$) the SCCPCH comparator 38 interprets the PCH of the received SCCPCH, and compares the MAC header of the received PCH output from the SCCPCH register 35, with the stored reference MAC header output from the reference MAC header register 36. The second AND gate 37 of the SCCPCH comparator 38 outputs an interrupt signal to the DBB 40 when the MAC header of the received SCCPCH and the reference MAC header coincide with each other, indicating that the paging is intended for the current terminal.

According to the interrupt signal (i.e., if the interrupt signal is generated), the DBB 40 is then supplied with the electric power to be operated. If the second AND gate 37 does not generate the interrupt signal, then the power to the DBB 40 is not supplied. Once turned on, the DBB 40 then analyzes the PI of the received PICH frame and the PCH of the SCCPCH frame outputted from the ABB 20 to receive a paging message.

As described above, the PICH comparator 34 and the SCCPCH comparator 38 perform the comparing processes for the PICH and the SCCPCH sequentially as needed, and thereby a more detailed electric power control can be made.

In the present invention, other hardware devices/elements may be used in lieu of the registers and AND gates as long as the functions discussed above are performed.

According to the present invention, a device (hardware) for identifying whether or not there is a paging for the WCDMA terminal is realized on a part (PICH/SCCPCH comparator 30) outside of the DBB, and thereby there is no need to identify the paging by the DBB at each and every discontinuous received (DXR) cycle. In addition, the DBB performs the paging message retrieval process only when the comparator 30 indicates that there is a paging for the WCDMA terminal, and therefore, the processing loads of the DBB can be reduced greatly.

Furthermore, according to the present invention, electric power is selectively supplied to the DBB to be operated only when there is a paging for the terminal (e.g., based on the interrupt signal), and thereby, the power consumption of the WCDMA terminal can be reduced significantly.

Moreover, modification to the PI and/or MAC header reference values can be easily made, as needed, by merely modifying the registers 32 and 36. Thus, overall, a more power-efficient and versatile WCDMA terminal is provided.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An apparatus for processing a paging for a wideband code division multiple access (WCDMA) terminal, the apparatus comprising:

a PICH (paging indicator channel) comparator for checking whether or not a paging indicator (PI) of a received PICH corresponds to a group to which the WCDMA terminal belongs, and generating an enable signal based on the comparison result;

a SCCPCH (secondary common control physical channel) comparator for interpreting a SCCPCH signal according to the enable signal, and outputting an interrupt signal to a DBB (digital base band unit) based on the interpreting result; and the digital base band unit (DBB) which operates according to the interrupt signal to obtain a paging message in the SCCPCH signal.

2. The apparatus of claim 1, wherein the PICH comparator comprises:

a reference PI register for storing a reference PI;

a PICH register for detecting the PI of the received PICH when electric power is supplied; and a first logic unit for outputting the enable signal when an output value of the PICH register and an output value of the reference PI register coincide with each other.

3. The apparatus of claim 2, wherein the DBB presets the reference PI in accordance with the group to which the WCDMA terminal belongs.

4. The apparatus of claim 1, wherein the SCCPCH comparator comprises:

a reference media access control (MAC) header register for storing a reference MAC header;

a SCCPCH register for detecting a MAC header of the SCCPCH signal in response to the enable signal; and a second logic unit for outputting the interrupt signal to the DBB when an output value of the SCCPCH register and an output value of the reference MAC header register coincide with each other.

5. The apparatus of claim 4, wherein the DBB presets the reference MAC header in accordance with an identification of the WCDMA terminal.

6. The apparatus of claim 1, wherein electric power is selectively supplied to the DBB based on the interrupt signal.

7. The apparatus of claim 1, wherein electric power is selectively supplied to the SCCPCH comparator based on the enable signal.

8. An apparatus for processing a paging for a WCDMA terminal, the apparatus comprising:

a page detecting unit which checks for a page; and a digital base band unit (DBB) which performs a paging message retrieval process by being selectively turned on under control of the page detecting unit, wherein the page detecting unit comprises:

a paging indicator channel (PICH) comparator for detecting a paging indicator (PI) of a received PICH, comparing the detected PI to a reference PI, and generating an enable signal based on this comparison result, and a secondary common control physical channel (SCCPCH) comparator being selectively turned on based on the enable signal, wherein the SCCPCH compares a media access control (MAC) header of a received SCCPCH signal with a reference MAC header, and selectively turns on the DBB based on this comparison result.

9. The apparatus of claim 8, wherein the DBB presets the reference PI and the reference MAC header according to information on the WCDMA terminal.

10. A method for processing a paging for a WCDMA terminal, the method comprising:

checking for, by a page detecting unit, a page;

selectively turning on a digital base band unit (DBB) under control of the page detecting unit; and performing, by the DBB, a paging message retrieval process once the DBB is turned on, wherein the page detecting unit includes a paging indicator channel (PICH) comparator and a secondary common control physical channel (SCCPCH) comparator, and wherein the checking step includes:

by the PICH comparator, detecting a paging indicator (PI) of a received PICH, comparing the detected PI to a reference PI, and generating an enable signal based on this comparison result, and selectively turning on the SCCPCH comparator based on the enable signal, and wherein the checking step further includes:

by the SCCPCH comparator, comparing a media access control (MAC) header of a received SCCPCH signal with a reference MAC header, whereby the DBB is selectively turned on based on this comparison result.

11. The method of claim 10, wherein the reference PI and the reference MAC header are preset by the DBB according to information on the WCDMA terminal.

12. A method for processing a paging for a wideband code division multiple access (WCDMA) terminal, the method comprising:

checking, by a PICH (paging indicator channel) comparator, whether or not a paging indicator (PI) of a received PICH corresponds to a group to which the WCDMA terminal belongs, and generating an enable signal based on the comparison result;

interpreting, by a SCCPCH (secondary common control physical channel) comparator, a SCCPCH signal according to the enable signal, and outputting an interrupt signal to a DBB (digital base band unit) based on the interpreting result; and operating the digital base band unit (DBB) according to the interrupt signal to obtain a paging message in the SCCPCH signal.

13. The method of claim 12, wherein the checking step includes:

storing, in a reference PI register, a reference PI;

detecting, by a PICH register, the PI of the received PICH when electric power is supplied to the PICH register; and outputting, by a first logic unit, the enable signal when an output value of the PICH register and an output value of the reference PI register coincide with each other.

14. The method of claim 13, wherein the reference PI is preset in accordance with the group to which the WCDMA terminal belongs.

15. The method of claim 12, wherein the interpreting step includes:

storing, in a reference media access control (MAC) header register, a reference MAC header;

detecting, by a SCCPCH register, a MAC header of the SCCPCH signal in response to the enable signal; and outputting, by a second logic unit, the interrupt signal to the DBB when an output value of the SCCPCH register and an output value of the reference MAC header register coincide with each other.

16. The method of claim 15, wherein the reference MAC header is preset in accordance with an identification of the WCDMA terminal.

17. The method of claim 12, wherein electric power is selectively supplied to the DBB based on the interrupt signal.

18. The method of claim 12, wherein electric power is selectively supplied to the SCCPCH comparator based on the enable signal.

19. A wideband code division multiple access (WCDMA) terminal comprising:
- a paging indicator channel (PICH) comparator for detecting a paging indicator (PI) of a received PICH, comparing the detected PI to a reference PI, and generating an enable signal based on this comparison result;
- a secondary common control physical channel (SCCPCH) comparator being selectively turned on based on the enable signal, wherein the SCCPCH compares a media access control (MAC) header of a received SCCPCH signal with a reference MAC header, and selectively turns on a DBB (digital base band unit) based on this comparison result; and
- the digital base band unit (DBB) which performs a paging message retrieval process by being selectively turned on under control of the SCCPCH comparator.

20. A wideband code division multiple access (WCDMA) terminal comprising:
- a SCCPCH (secondary common control physical channel) comparator to compare a media access control (MAC) header information of a received SCCPCH signal with a reference MAC header information and to generate a power on/off signal based on this comparison result; and
- a digital base band unit (DBB) being turned on or off according to the power on/off signal, and accessing a paging message in the SCCPCH signal while the DBB is turned on.

21. The WCDMA terminal of claim 20, wherein electric power to the SCCPCH comparator is selectively applied depending on whether or not a paging exists for the WCDMA terminal.

* * * * *